United States Patent
Scates

(10) Patent No.: US 11,311,844 B2
(45) Date of Patent: Apr. 26, 2022

(54) CONTINUOUS COMPOUNDING SYSTEMS AND METHODS OF USE

(71) Applicant: Berry Global, Inc., Evansville, IN (US)

(72) Inventor: Donald W. Scates, Franklin, KY (US)

(73) Assignee: Berry Global, Inc., Evansville, IN (US)

( * ) Notice: Subject to any disclaimer, the term of this patent is extended or adjusted under 35 U.S.C. 154(b) by 572 days.

(21) Appl. No.: 16/278,825

(22) Filed: Feb. 19, 2019

(65) Prior Publication Data

US 2019/0255491 A1 Aug. 22, 2019

Related U.S. Application Data

(60) Provisional application No. 62/632,701, filed on Feb. 20, 2018.

(51) Int. Cl.

| | |
|---|---|
| *B01F 3/14* | (2006.01) |
| *B01F 3/12* | (2006.01) |
| *B01F 7/12* | (2006.01) |
| *B01F 15/02* | (2006.01) |
| *B29C 48/285* | (2019.01) |
| *B29C 48/39* | (2019.01) |
| *B29B 7/48* | (2006.01) |
| *B29B 7/74* | (2006.01) |
| *B29B 7/94* | (2006.01) |

(Continued)

(52) U.S. Cl.
CPC ............ *B01F 3/14* (2013.01); *B01F 3/1221* (2013.01); *B01F 7/12* (2013.01); *B01F 15/0251* (2013.01); *B29B 7/488* (2013.01); *B29B 7/603* (2013.01); *B29B 7/7485* (2013.01); *B29B 7/94* (2013.01); *B29C 48/297* (2019.02); *B29C 48/39* (2019.02); *B29C 48/67* (2019.02); *C08J 3/201* (2013.01); *C08J 3/226* (2013.01); *C08K 3/26* (2013.01); *B01F 2215/0049* (2013.01); *C08K 2003/265* (2013.01)

(58) Field of Classification Search
CPC .. B01F 15/02; B01F 5/106; B01F 5/12; B01F 7/00416; B01F 7/00708; B01F 7/02; B01F 7/16; B01F 7/24; B29B 7/488; B29B 7/603; B29B 7/7485; B29B 7/94; B29C 48/297; B29C 48/39; B29C 48/67
See application file for complete search history.

(56) References Cited

U.S. PATENT DOCUMENTS 2,460,884 A * 2/1949 Hjort ..................... B28C 5/06
 241/1
2,896,556 A * 7/1959 Sippel .................... A21C 1/00
 366/76.3

(Continued)

FOREIGN PATENT DOCUMENTS

| CA | 2459781 A1 * | 5/2000 | ............ B29C 48/285 |
| EP | 3693150 A1 * | 8/2020 | ............. B29B 7/845 |

OTHER PUBLICATIONS

Buss, "Buss Kneader Technology," Jan. 10, 2016, 16 pages.

(Continued)

*Primary Examiner* — Tony G Soohoo
(74) *Attorney, Agent, or Firm* — Barnes & Thornburg LLP

(57) ABSTRACT

Continuous compounding systems include a feeding section and a compounding section. Method for compounding or mixing solid matter and liquid matter include providing a continuous compounding system, adding matter to the continuous compounding system, and mixing or compounding the matter.

20 Claims, 6 Drawing Sheets

(51) Int. Cl.
   *B29C 48/67* (2019.01)
   *B29B 7/60* (2006.01)
   *C08J 3/22* (2006.01)
   *C08K 3/26* (2006.01)
   *C08J 3/20* (2006.01)

(56) References Cited

U.S. PATENT DOCUMENTS

| | | | | |
|---|---|---|---|---|
| 3,049,750 | A * | 8/1962 | Austin | B01J 2/10 |
| | | | | 425/222 |
| 3,148,412 | A | 9/1964 | Spreeuwers | |
| 3,164,107 | A * | 1/1965 | Oakes | A21C 1/003 |
| | | | | 366/76.3 |
| 3,383,096 | A * | 5/1968 | Braibanti | A21C 1/06 |
| | | | | 366/76.2 |
| 3,563,514 | A * | 2/1971 | Shattuck | B29C 48/501 |
| | | | | 366/75 |
| 3,687,288 | A * | 8/1972 | Lynch | B29B 7/424 |
| | | | | 210/741 |
| 3,746,315 | A * | 7/1973 | Rizzi | B29C 48/39 |
| | | | | 366/294 |
| 3,827,678 | A * | 8/1974 | Andrews, III | B29C 48/288 |
| | | | | 366/76.91 |
| 3,888,997 | A * | 6/1975 | Guibert | B01F 7/00275 |
| | | | | 426/27 |
| 3,892,390 | A * | 7/1975 | Eauclaire | B29C 48/286 |
| | | | | 366/76.3 |
| 3,900,547 | A * | 8/1975 | Hunt | C09C 1/58 |
| | | | | 264/117 |
| 4,054,271 | A * | 10/1977 | Lanzillo | A23G 3/0226 |
| | | | | 366/70 |
| 4,064,829 | A * | 12/1977 | Hervert | B01J 8/382 |
| | | | | 118/716 |
| 4,352,567 | A * | 10/1982 | Guibert | A21C 1/14 |
| | | | | 366/323 |
| 4,443,109 | A | 4/1984 | Watts | |
| 4,473,299 | A * | 9/1984 | Guibert | A21C 1/06 |
| | | | | 366/156.2 |
| 4,474,473 | A * | 10/1984 | Higuchi | C09B 67/0021 |
| | | | | 366/75 |
| 4,490,046 | A * | 12/1984 | Guibert | B01F 7/24 |
| | | | | 366/297 |
| 4,591,467 | A * | 5/1986 | Kopernicky | B29C 45/63 |
| | | | | 264/37.17 |
| 4,616,989 | A * | 10/1986 | Mewes | B29B 7/90 |
| | | | | 425/203 |
| 4,640,622 | A * | 2/1987 | Sortwell | B01F 5/248 |
| | | | | 366/156.1 |
| 5,259,749 | A * | 11/1993 | Meixner | B29B 7/72 |
| | | | | 425/205 |
| 5,286,121 | A * | 2/1994 | Tsay | A21C 1/083 |
| | | | | 366/155.1 |
| 5,297,865 | A * | 3/1994 | Engel | B29B 7/7461 |
| | | | | 366/76.3 |
| 5,332,308 | A | 7/1994 | Scheuring | |
| 5,728,411 | A * | 3/1998 | Fowler | A21C 3/04 |
| | | | | 425/142 |
| 5,749,649 | A * | 5/1998 | Schobert-Csongor | B29B 7/429 |
| | | | | 366/76.4 |
| 6,168,306 | B1 * | 1/2001 | Degady | A23G 4/00 |
| | | | | 366/76.1 |
| 6,220,745 | B1 * | 4/2001 | Kobayashi | B29B 7/483 |
| | | | | 366/83 |
| 6,280,074 | B1 * | 8/2001 | Kuroda | B29B 7/465 |
| | | | | 366/76.3 |
| 6,601,708 | B1 * | 8/2003 | Degady | A23G 4/00 |
| | | | | 209/234 |
| 6,945,687 | B2 * | 9/2005 | Guntherberg | B29C 48/29 |
| | | | | 366/76.3 |
| 7,040,797 | B1 * | 5/2006 | Yamaguchi | B29B 7/826 |
| | | | | 366/76.1 |
| 7,169,340 | B2 * | 1/2007 | Hawley | B29C 48/2694 |
| | | | | 264/136 |
| 7,244,060 | B2 * | 7/2007 | Inoue | B29C 48/08 |
| | | | | 366/76.3 |
| 7,293,909 | B2 * | 11/2007 | Taniguchi | B01F 1/0011 |
| | | | | 210/194 |
| 7,476,416 | B2 | 1/2009 | Tynan, Jr. | |
| 9,440,374 | B2 * | 9/2016 | Schwarz | B29B 9/14 |
| 9,732,279 | B2 * | 8/2017 | Houk | B29C 48/92 |
| 9,809,755 | B2 * | 11/2017 | Houk | B29C 35/02 |
| 10,035,291 | B2 * | 7/2018 | Blach | B29C 48/2886 |
| 10,532,134 | B2 * | 1/2020 | Zhou | A61L 27/427 |
| 2002/0137838 | A1 | 9/2002 | Silvi | |
| 2003/0232957 | A1 * | 12/2003 | Silvi | B29C 48/767 |
| | | | | 528/86 |
| 2006/0120212 | A1 * | 6/2006 | Taniguchi | B29C 48/385 |
| | | | | 366/118 |
| 2008/0267002 | A1 * | 10/2008 | Rannasmaa | B29C 45/1816 |
| | | | | 366/78 |
| 2008/0267003 | A1 * | 10/2008 | Kasliwal | B29B 7/603 |
| | | | | 366/85 |
| 2012/0140587 | A1 * | 6/2012 | Liechti | B29B 7/7461 |
| | | | | 366/76.4 |
| 2016/0289397 | A1 | 10/2016 | Tinkl | |

OTHER PUBLICATIONS

Krauss Maffei Berstorff, "Maximum Flexibility, High Product Quality, Optimum Cost Effectiveness, ZE Twin-Screw Extruders," available at least by Jan. 11, 2018, 30 pages.
Entex Rust & Mitschke Gmbh, "Technical-Information," Information Handout No. 8, available at least by Jan. 11, 2018, 3 pages.
Entex Rust & Mitschke Gmbh, "Technical-Information," Information Handout No. 7, available at least by Jan. 11, 2018, 4 pages.
Entex Rust & Mitschke Gmbh, "Technical-Information," Information Handout No. 15, available at least by Jan. 11, 2018, 6 pages.
Edited by Maskan et al., "Advances in Food Extrusion Technology," CRC Press, 2012, p. 42.
Maris Techonological Company, "The Extruder, Components of a Success," availble at least by Jan. 11, 2018, 20 pages.
International Search Report and Written Opinion for International (PCT) App. No. PCT/US19/18465, dated May 8, 2019, BP-523 PCT II (5723-290466), 8 pages.

\* cited by examiner

CONTINUOUS COMPOUNDING SYSTEMS AND METHODS OF USE

PRIORITY CLAIM

This application claims priority under 35 U.S.C. § 119(e) to U.S. Provisional Application No. 62/632,701, filed Feb. 20, 2018, which is expressly incorporated by reference herein.

BACKGROUND

The present disclosure relates to compounding systems and methods of use. More particularly, the present disclosure relates to continuous compounding systems and methods for mixing or compounding solid and liquid matter.

SUMMARY

According to the present disclosure, continuous compounding systems are configured to apply pressure and sometimes heat to a formulation to form a material such as a viscous mass, a compound, or molten resin. In illustrative embodiments, the continuous compounding systems include a feeding section and a compounding section. The feeding section is configured to receive an initial formulation of matter continuously from a hopper, for example. The compounding section receives the initial formulation from the feeding section and applies pressure and sometimes heat to the initial formulation to form the initial material.

Illustratively, the continuous compounding systems include means for adding dry solid matter to the compounding section at a location downstream of the feeding section and for mixing liquid matter and the solid dry matter to form a slurry that mixes with initial material in the compounding section at the location downstream of feeding section. As a result, wear of the compounding machine may be reduced around the location where the dry solid matter is added and a final mixture of the materials may be more uniform.

In illustrative embodiments, a method for continuously compounding matter includes providing a continuous compounding system that includes a feeding section and a compounding section located downstream of the feeding section. The method further includes adding initial formulation to the feeding section and conveying the initial formulation from the feeding section to the compounding section. The compounding section applies pressure to the initial formulation to form an initial material. The dry solid matter and the liquid matter are mixed together to form a slurry and the slurry is mixed with the initial material in the compounding section.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 7:
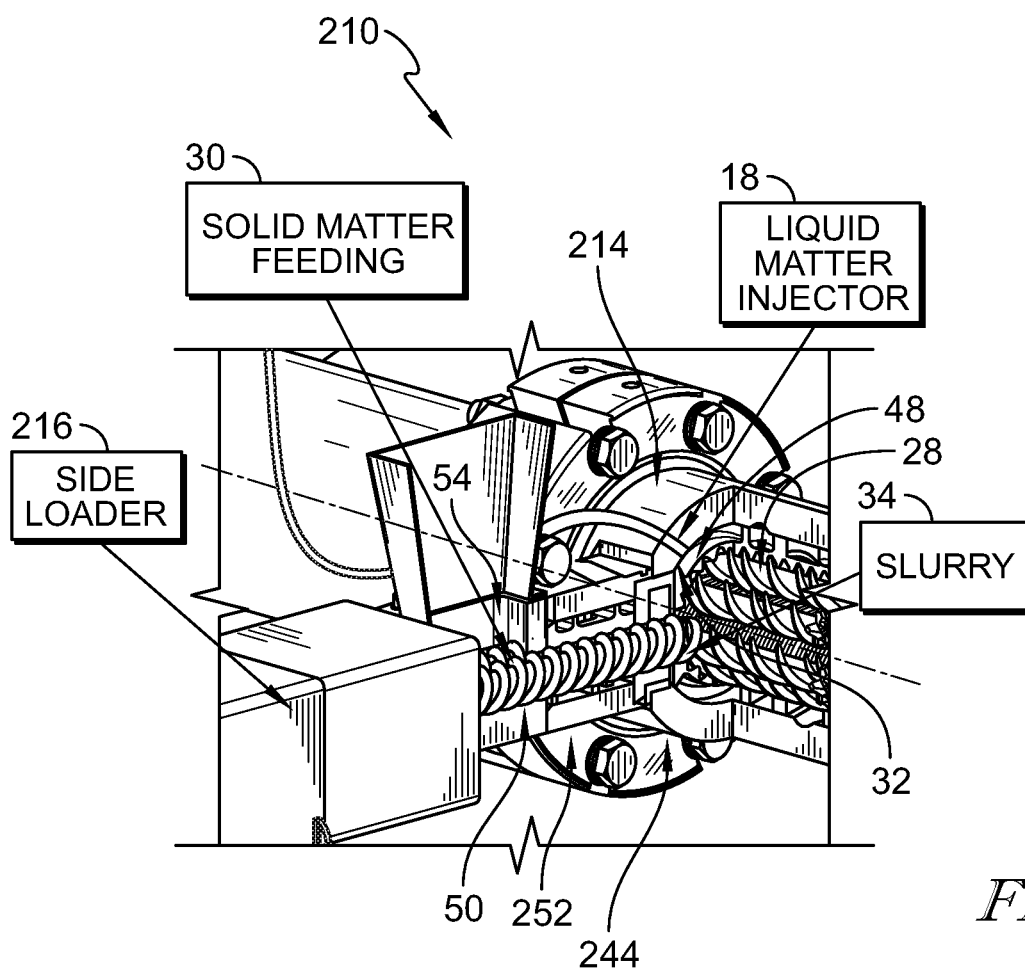
FIG. 7 is perspective and diagrammatic view of another embodiment of a continuous compounding system with portions cutaway to show a side loader coupled to a compounding section included in the continuous compounding system and further showing that the side loader is configured to feed dry solid matter to the compounding section at a downstream location and a liquid injector is coupled to the compounding section and configured to inject liquid matter into the compounding section at the same downstream location so that the dry solid matter and the liquid matter form a slurry in the compounding section.
Figure 8:
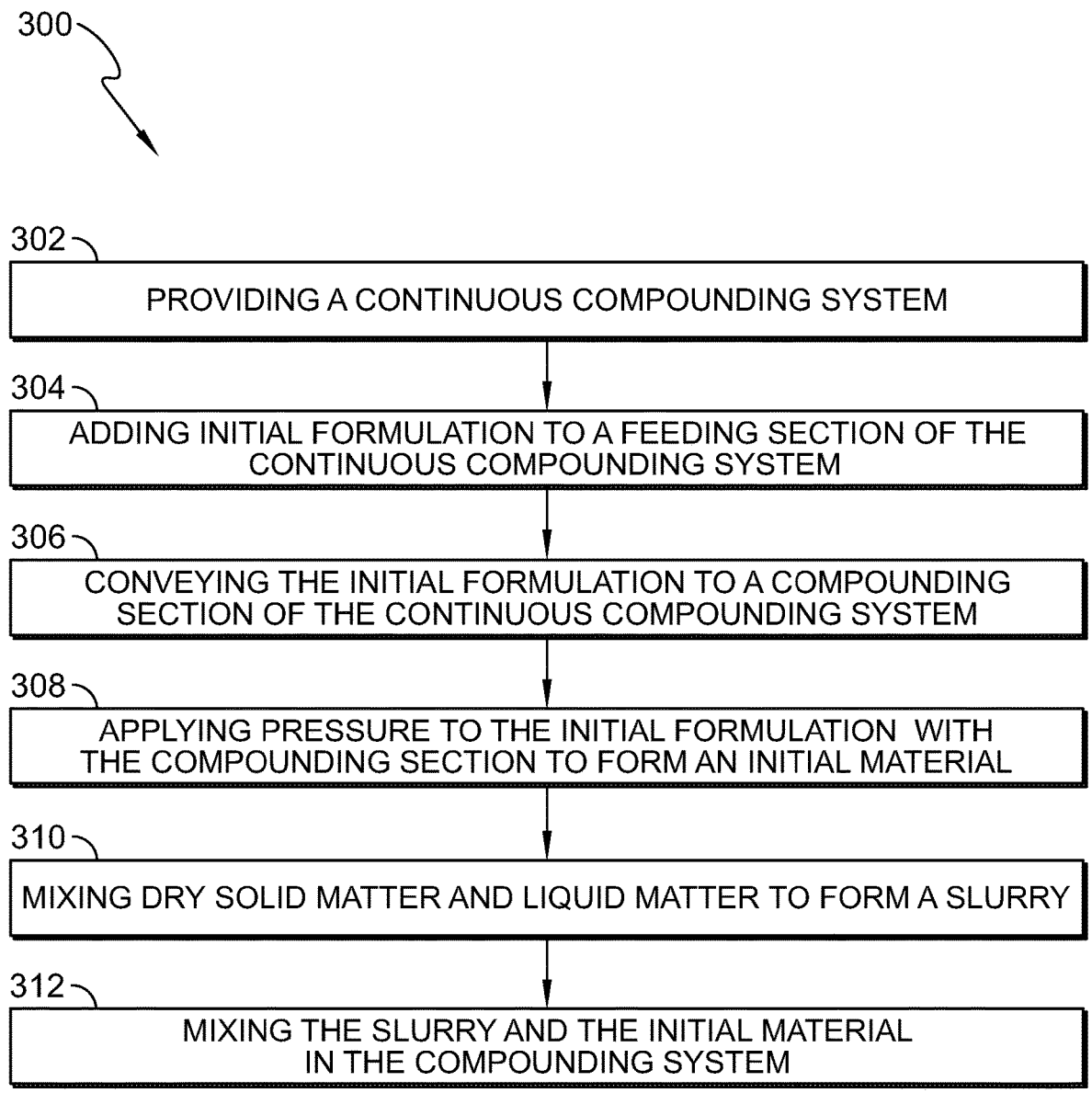
FIG. 8 is a flow chart showing a method of continuously compounding or mixing matter.
Figure 9:
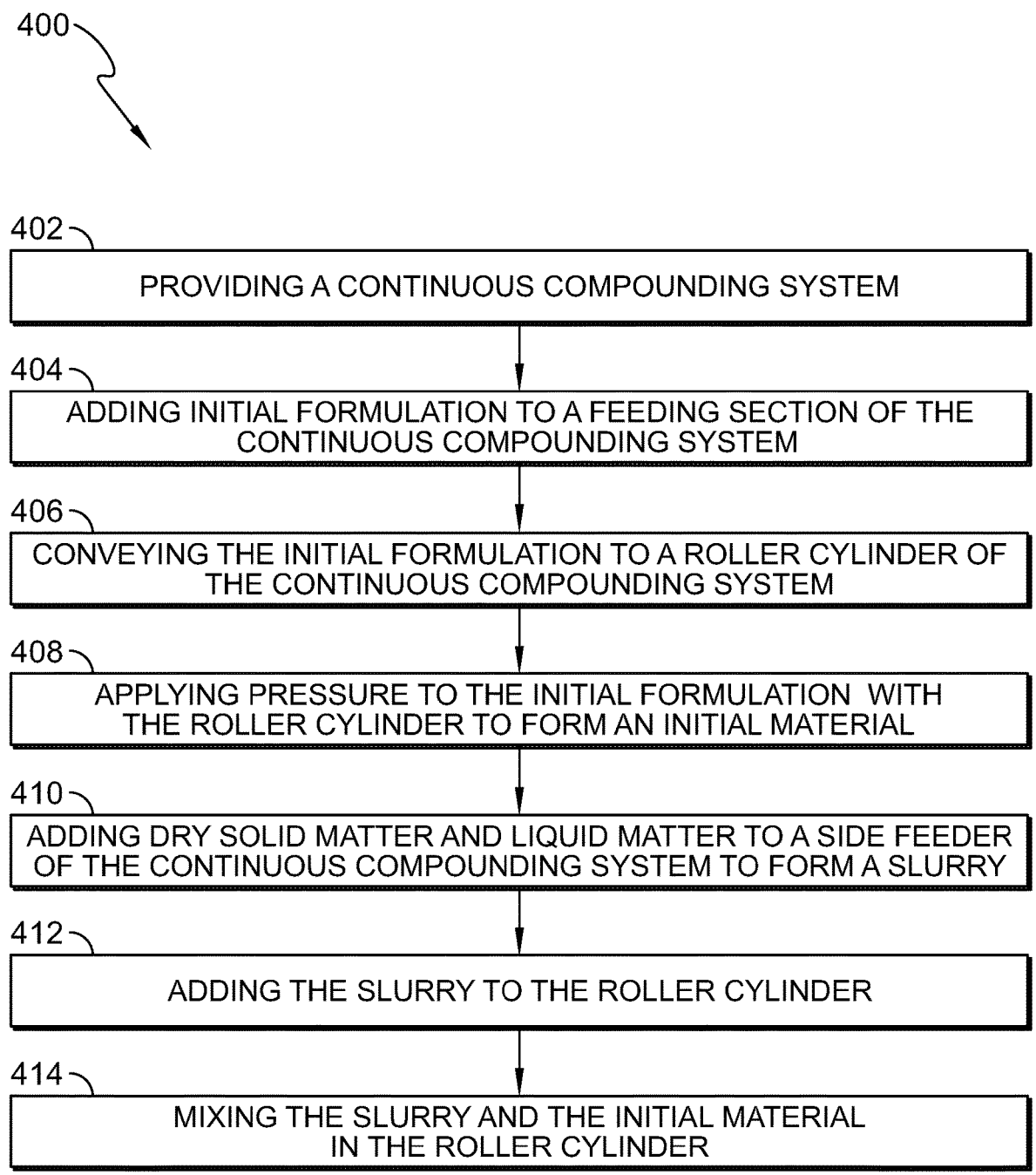
FIG. 9 is a flow chart showing another method of continuously compounding or mixing matter.

A continuous compounding system 10 in accordance with the present disclosure is shown in FIGS. 1-6. Another embodiment of a continuous compounding system 210 is shown in FIG. 7. A continuous compounding process 300 for continuously compounding or mixing matter in accordance with the present disclosure is shown in FIG. 8. Another continuous compounding process 400 for continuously compounding or mixing matter in accordance with the present disclosure is shown in FIG. 9.

Continuous compounding machines may include co-rotating and counter-rotating twin screw extruders, planetary extruders, continuous mixers, kneader mixers, and single screw extruders with or without special mixing sections.

Continuous compounding machines may be used in many industries and may be used in the production of a variety of products. Products compounded or mixed might be any combination of various solids, liquids, and/or gases. Products compounded or mixed by batch methods could instead be compounded or mixed by one or more continuous compounding machines if an appropriate continuous production process is developed.

When using continuous compounding machines for continuous production processes, it may be helpful to add materials at various points in the machines. By adding materials at various points in continuous compounding machines, it is possible to mix or compound together part of the materials, and then add more materials later in the mixing or compounding process by adding materials to the continuous compounding machine at points downstream of where the earlier materials were added.

Materials may be added to points downstream in continuous compounding machines by adding solids or liquids into various open ports, injecting liquids, injecting gases, and adding solid or semi-solid materials by various side loaders, such as, for example, side feeders or side stuffers. Side feeders and/or side stuffers are sometimes used to add solid or semi-solid materials into continuous compounding machines by forcing the materials into the mixing or compounding process with co-rotating twin screws, counter-rotating twin screws, a single screw, or other arrangements that are suitable for moving solid or semi-solid materials.

Side loaders are sometimes used to force materials including rather dry solid materials into the mixing or compounding process of continuous compounding machines. Rather dry solid materials could include various flakes, dusts, powders, pellets, crumbs, or other shape materials. Rather dry solid materials may sometimes be difficult to properly mix or compound inside continuous compounding machines. Liquids may be added to the mixing or compounding process of continuous compounding machines. Liquids may be injected directly into the mixing or compounding process or added at various open ports.

According to the present disclosure, liquid(s) are injected into the side loader(s), for example side feeder(s) and/or side stuffer(s), to join material(s) including rather dry solid material(s) and using the side loader(s) to force the material(s) including rather dry solid material(s) and liquid(s) both together into the mixing or compounding process of a continuous compounding machine. The result may provide an improved mixing or compounding process that may include uniform mixing or compounding as might be determined by visual inspection or various testing of the mixed or compounded product. The liquid(s) may provide a lubricating effect to reduce localized wear in the continuous compounding machine that would otherwise occur due to adding the material(s) including rather dry solid material(s) alone.

In some embodiments, liquid injection port(s) are installed into the side feeder(s) or side stuffer(s). The injected liquid(s) joined the material(s) including rather dry solid material(s) and both together are moved into the mixing or compounding process of a continuous compounding machine by the side feeder(s) or side stuffer(s).

In some embodiments, the liquid(s) is added to the side feeder(s) or side stuffer(s) through various open port(s) instead of liquid injection. In some embodiments, the liquid(s) is injected directly into the mixing or compounding process of continuous compounding machines at generally the same point where material(s) including rather dry solid material(s) are forced in the mixing or compounding process using the side feeder(s) or side stuffer(s).

Figure 1:
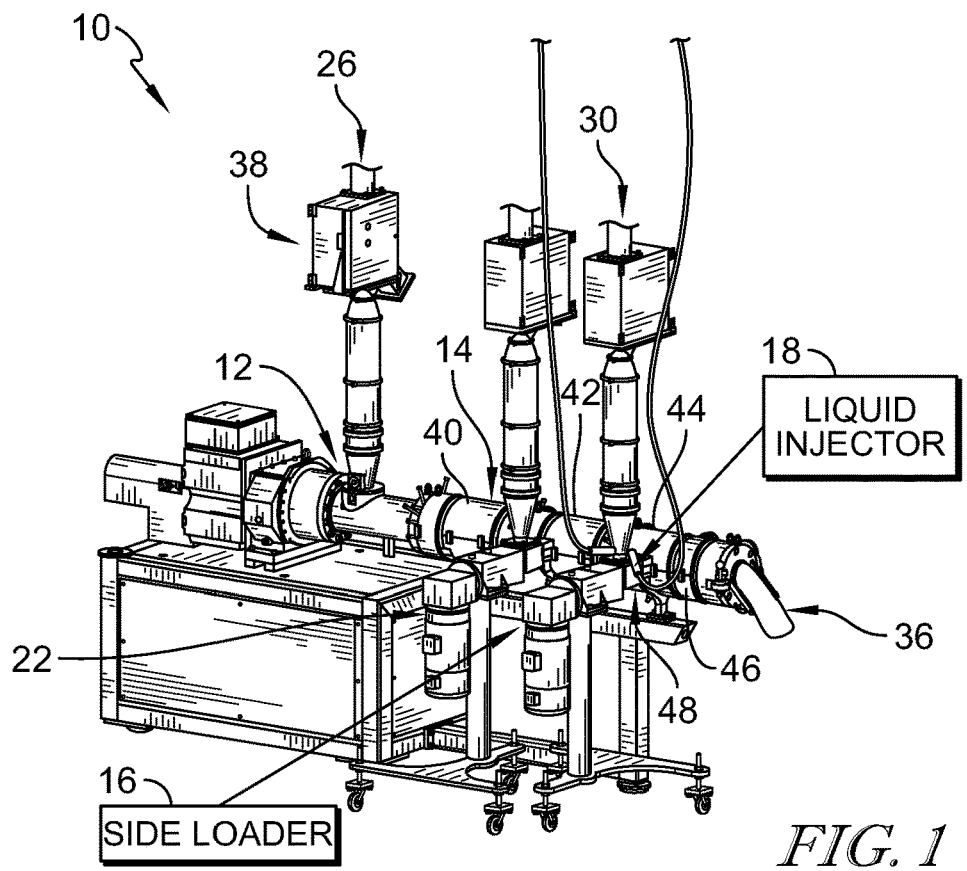
FIG. 1 is a perspective and diagrammatic view of a continuous compounding system in accordance with the present disclosure for processing matter to provide an extrudable and homogeneous material, the continuous compounding system including, from left to right, a feeding section, a compounding section located downstream of the feeding section, two side loaders coupled to a side of the compounding section, liquid injectors coupled to one of the side loaders, and an extruder section located downstream of the compounding section.
Figure 2:
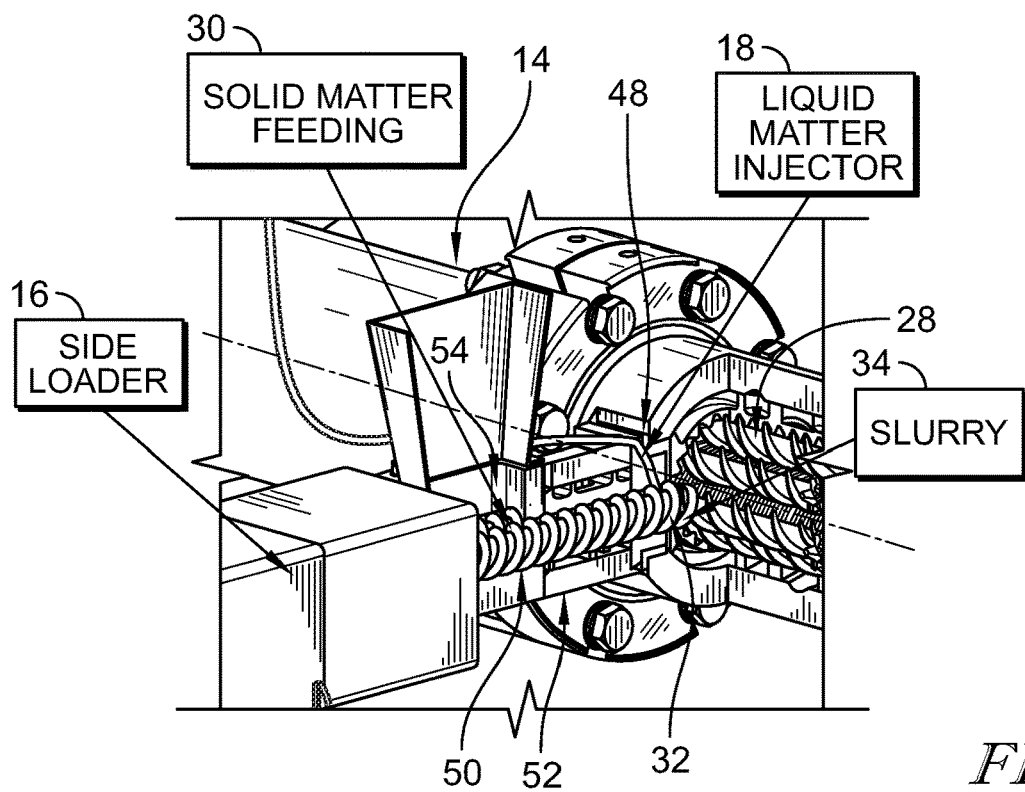
FIG. 2 is a perspective and diagrammatic view of the continuous compounding system of FIG. 1 with a portion cutaway to show one of the side loaders and a portion of the compounding section and further showing that the side loader is configured to receive relatively dry solid matter from a feeder and liquid matter through the liquid injector to form a slurry that is added to the compounding section to minimize wear to the compounding section at the location where the dry solid matter is added and to maximize the homogeneity of the processed material.

Continuous compounding systems 10, 210 are configured to receive solid matter 30 and liquid matter 32 and process the matter 30, 32 to form extrudable and/or homogenous material 36 as suggested in FIGS. 1 and 2. In the illustrative embodiment, material 36 is an adhesive material.

Continuous compounding system 10 includes a feeding section 12 and a compounding section 14 as shown in FIG. 1. Feeding section 12 is configured to receive an initial formulation 26 of matter. Compounding section 14 is configured to receive initial formulation 26 of matter from feeding section 12 and apply pressure to initial formulation 26 to form an initial material 28. Initial material 28 is, for example, an initial compound, an initial molten resin, or initial viscous mass. Other examples of an initial material may include an adhesive, a plastic material, a paint, a food product, pet food, or other suitable materials. Continuous compounding system 10 further includes means for adding dry solid matter 30 to compounding section 14 at a location 48 downstream of feeding section 12 and for mixing liquid matter 32 and solid dry matter 30 to form a slurry 34 that mixes with initial molten resin 28 in compounding section 14 at location 48 downstream of feeding section 12.

Figure 3:
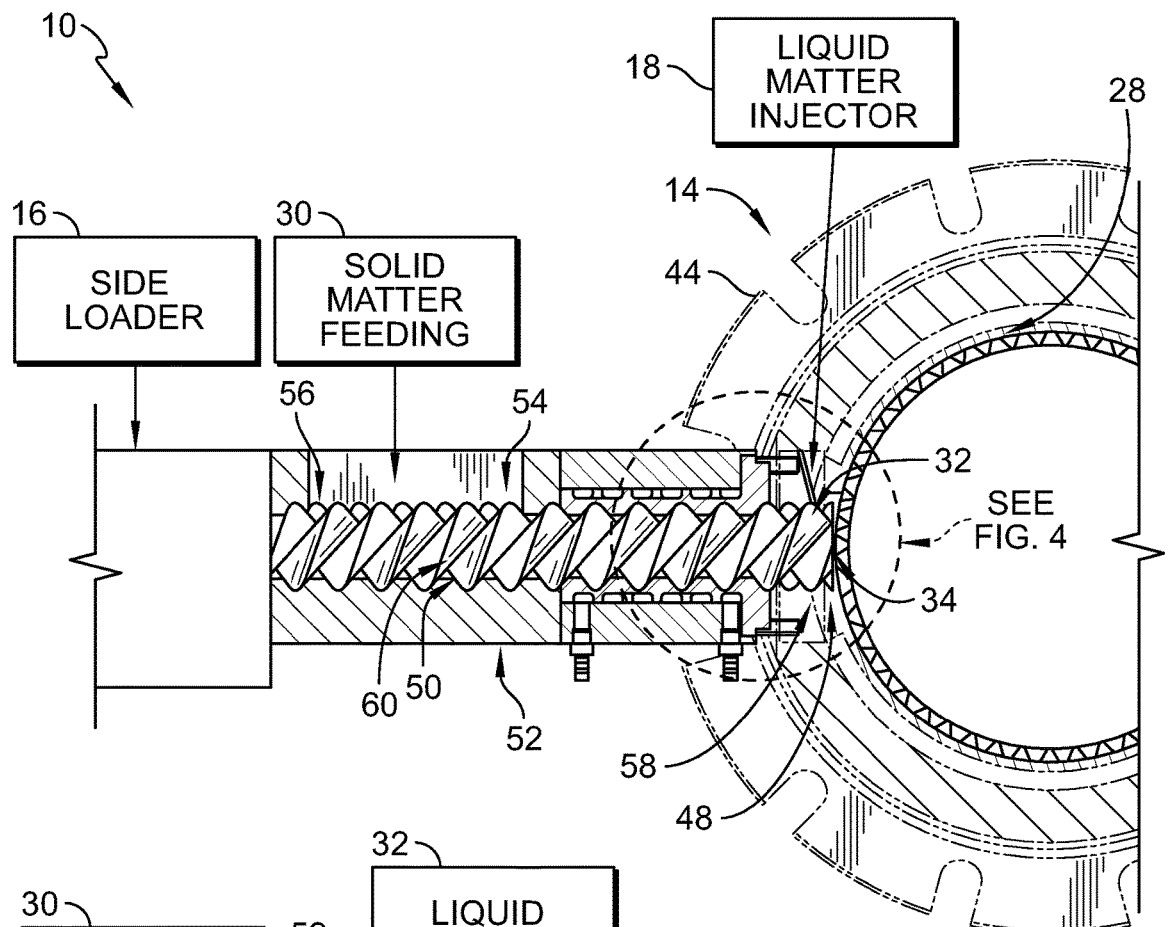
FIG. 3 is a section and diagrammatic view of the side loader and compounding section of FIG. 2 showing that the side loader is coupled to the side of the compounding section to supply the dry solid matter to the compounding section downstream of the feeding section and further showing that the side loader includes a pair of spindles and a housing arranged around the spindles and the housing is formed to include an opening for receiving the dry solid matter and a passageway for the liquid matter to be injected toward the spindles and mix with the dry solid matter.
Figure 4:
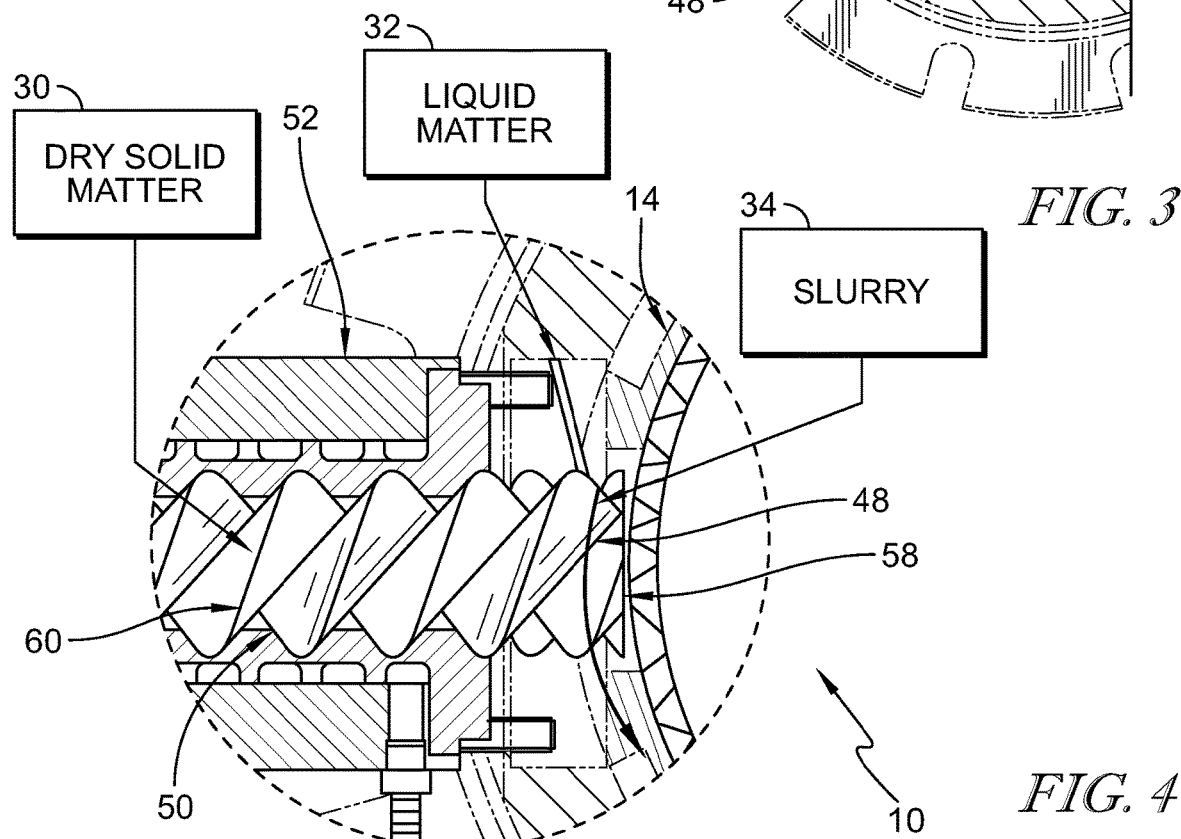
FIG. 4 is an enlarged view of FIG. 3 showing that the dry solid matter is moved toward the compounding section by the pair of spindles and that the liquid matter is injected near an end of the pair of spindles to mix with the dry solid matter and form the slurry that is added to the compounding section.
Figure 5:
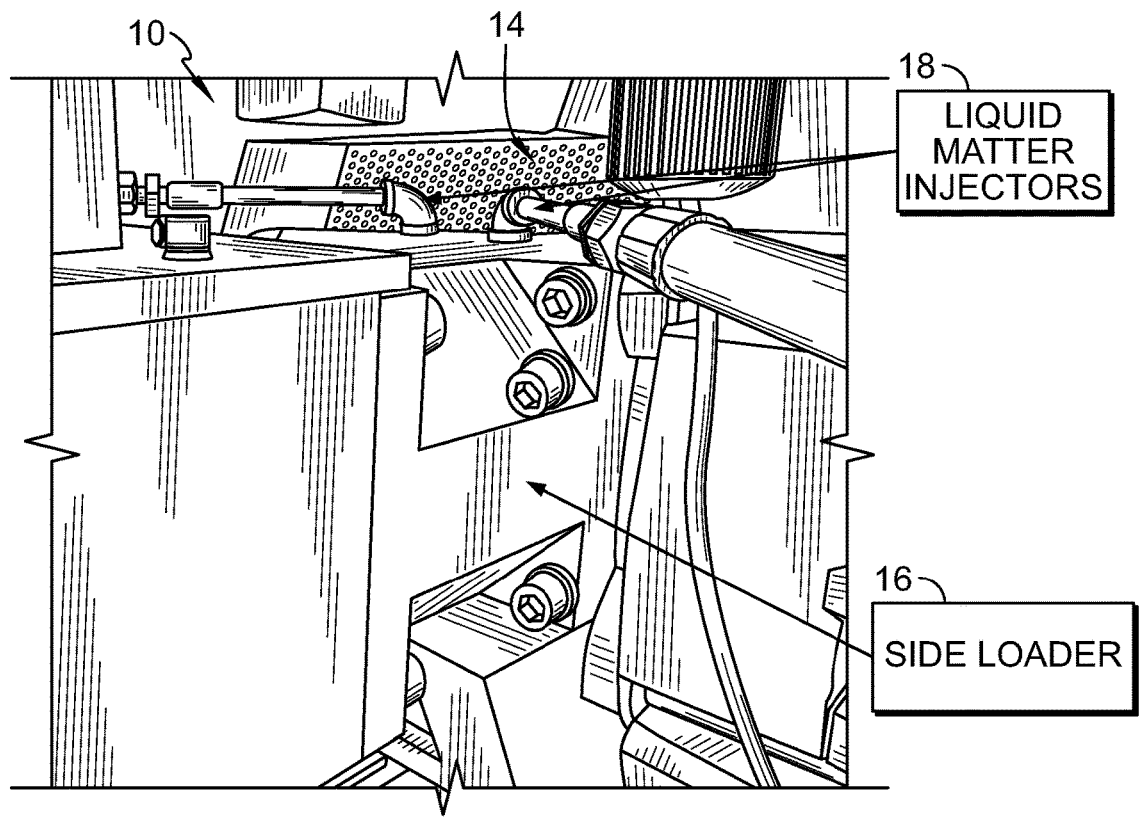
FIG. 5 is a perspective and diagrammatic view of the side loader and the portion of the compounding section showing that two liquid injectors are coupled to the side loader and configured to inject the liquid matter into the side loader.
Figure 6:
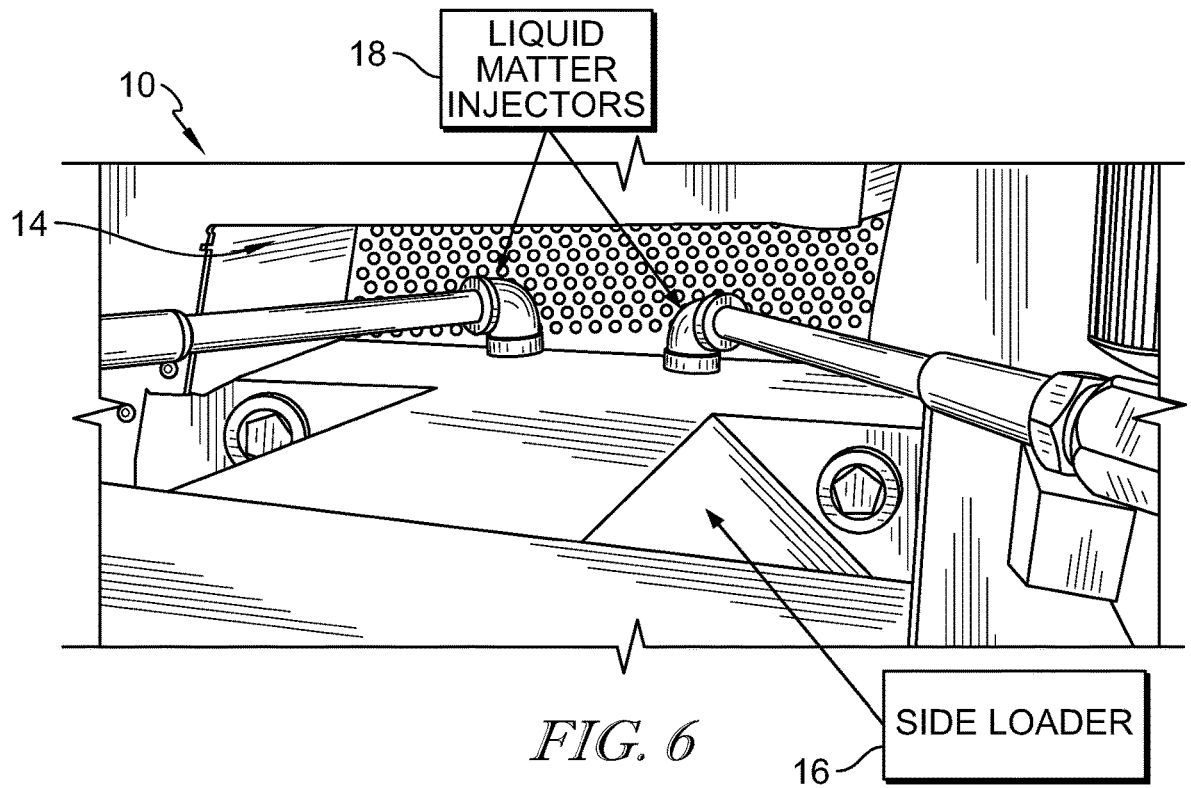
FIG. 6 is a perspective and diagrammatic view similar to FIG. 5 of the side loader and a portion of the compounding section.

Continuous compounding system 10 includes side loader 16 and liquid injector 18 as shown in FIGS. 1 and 2. Side loader 16 is coupled to compounding section 14 and configured to convey dry solid matter 30 into compounding section 14 at downstream location 48. Liquid injector 18 is configured to add liquid matter 32 to at least one of compounding section 14 and side loader 16 to form a slurry 34 that mixes with initial molten resin 28 in compounding section 14 at downstream location 48. In some embodiments, liquid injector 18 is coupled fluidly to side loader 16 as shown in FIGS. 3 and 4. In some embodiments, liquid injector 18 is coupled fluidly directly to compounding section 14 as shown in FIG. 7.

Initial formulation 26 is provided to feeding section 12 by hopper 38 and feeding section 12 conveys initial formulation 26 to compounding section 14 as suggested in FIG. 1. Initial formulation 26 may include any suitable combination of solid and liquid matter. In the illustrative embodiment, initial formulation 26 includes a tackifying resin and dry powdered matter. Additional matter such as, for example, dry solid matter 30 and liquid matter 32, is added to compounding section 14 with side loader 16 and liquid injector 18 at locations downstream of feeding section 12 as suggested in FIG. 2. In the illustrative embodiment, dry solid matter 30 includes calcium carbonate and liquid matter 32 includes polyisobutylene.

Compounding section 14 is coupled to a downstream end of feeding section 12 and is configured to receive continuously initial formulation 26 from feeding section 12 as suggested in FIGS. 1 and 2. Compounding section 14 applies pressure to initial formulation 26 to form initial material 28 such as molten resin 28 or viscous mass 28. Illustratively, compounding section 14 includes a roller cylinder having a first cylinder 40, a second cylinder 42, a third cylinder 44, and a fourth cylinder 46. Matter may be added to any of cylinders 40, 42, 44, 46. In other embodiments, compounding section 14 includes a screw extruder such as a twin screw extruder.

Side loader 16 is coupled to compounding section 14 downstream of feeding section 12 as shown in FIG. 1. Side loader 16 adds dry solid matter 30 to compounding section 14 at a downstream axial location 48 (sometimes referred to as an axial location) as suggested in FIGS. 1-4. Side loader 16 includes a side feeder 16 in the illustrative embodiment. In other embodiments, side loader 16 includes a side stuffer or any other suitable alternative for adding additional matter to compounding section 14. Side loader 16 is configured to add matter at or before third cylinder 44 in the illustrative embodiment.

Side loader 16 includes a pair of spindles 50 (sometimes called screws) and a housing 52 arranged around spindles 50 as shown in FIG. 2. Housing 52 is formed to include an opening 54 for receiving dry solid matter 30 and a side-loader passageway 60 for liquid matter 32 injection into housing 52 toward spindles 50. Spindles 50 have a first end 56 and a second end 58 spaced apart from first end 56. Second end 58 of spindles 50 is located toward compounding section 14.

Liquid injector 18 adds liquid matter 32 to at least one of compounding section 14 and side loader 16 to cause liquid matter 32 to mix with dry solid matter 30 and form slurry 34 that mixes with initial formulation 26 in compounding section 14 at downstream location 48 (axial location 48). In the illustrative embodiment, liquid injector 18 adds liquid matter 32 to side loader 16. In some embodiments, liquid injector 18 adds liquid matter 32 to compounding section 14.

Liquid injector 18 is in fluid communication with the passageway 60 formed in housing 52 of side loader 16 as shown in FIGS. 2-4. Liquid injector 18 is configured to inject fluid into side loader 16 toward second end 58 of spindles 50.

In the illustrative embodiment, continuous compounding system 10 further includes another side loader 22 as shown in FIG. 1. The continuous compounding system 10 may further include an extruder for extruding the material 36. Side loader 22 is coupled to compounding section 14 between feeding section 12 and side loader 16. The extruder may be coupled to a downstream end of compounding section 14.

Continuous compounding system 210 is provided in another embodiment of the present disclosure as shown in FIG. 7. Continuous compounding system 210 includes feeding section 12 and a compounding section 214. Feeding section 12 is configured to receive initial formulation 26 of matter. Compounding section 214 is configured to receive initial formulation 26 from feeding section 12 and apply pressure to initial formulation 26 to form initial material 28 such as molten resin 28 or viscous mass 28. Continuous compounding system 210 further includes means for adding dry solid matter 30 to compounding section 214 at a location 48 downstream of feeding section 12 and for mixing liquid matter 32 and solid dry matter 30 to form a slurry 34 that mixes with initial molten resin 28 in compounding section 214 at location 48 downstream of feeding section 12.

Continuous compounding system 10 includes a side loader 216 and liquid injector 18 as shown in FIG. 7. Side loader 216 is coupled to compounding section 14 and configured to convey dry solid matter 30 into compounding section 14 at downstream location 48. Liquid injector 18 is configured to add liquid matter 32 to compounding section 214 to form a slurry 34 that mixes with initial molten resin 28 in compounding section 214 at downstream location 48. Liquid injector 18 is coupled fluidly to compounding section 214 as shown in FIG. 7.

Compounding section 214 is coupled to a downstream end of feeding section 12 and is configured to receive continuously initial formulation 26 from feeding section 12 as suggested in FIG. 7. Compounding section 214 applies pressure to initial formulation 26 to form initial molten resin 28. Illustratively, compounding section 214 includes a roller cylinder having first cylinder 40, second cylinder 42, a third cylinder 244, and fourth cylinder 46. Matter may be added to any of cylinders 40, 42, 244, 46.

Side loader 216 is coupled to compounding section 214 downstream of feeding section 12 as suggested in FIG. 7. Side loader 216 adds dry solid matter 30 to compounding section 214 at location 48. Side loader 216 includes a side feeder in the illustrative embodiment. In other embodiments, side loader 216 includes a side stuffer or any other suitable alternative for adding additional matter to compounding section 214.

Side loader 216 includes a pair of spindles 50 (sometimes called screws) and a housing 252 arranged around spindles 50 as shown in FIG. 7. Housing 252 is formed to include an opening 54 for receiving dry solid matter 30. In the illustrative embodiment, housing 252 does not include a side-loader passageway 60 for liquid matter 32 injection into housing 252 toward spindles 50.

In the illustrative embodiment, continuous compounding system 210 may further include another side loader and an extruder. The other side loader may be coupled to compounding section 214 between feeding section 12 and side loader 216. The extruder may be coupled to a downstream end of compounding section 214.

Method 300 for continuously compounding matter includes a plurality of steps as shown in FIG. 8. In a step 302, continuous compounding system 10, 210 is provided. Continuous compounding system 10, 210 includes feeding section 12, and compounding section 14, 214 located downstream of feeding section 12. In a step 304, initial formulation 26 is added to feeding section 12. In a step 306, initial formulation 26 is conveyed from feeding section 12 to compounding section 14, 214. In a step 308, pressure is applied to initial formulation 26 with compounding section 14, 214 to form initial material 28. Compounding sections 14, 214 masticate, mix, heat, and/or compound initial formulation 26 to apply pressure to initial formulation 26 in illustrative embodiments. In a step 310, dry solid matter 30 and liquid matter 32 are mixed to form slurry 34 as shown in FIG. 8. In a step 312, slurry 34 and initial material 28 are mixed in compounding section 14, 214.

Method 300 may further include adding dry solid matter 30 and liquid matter 32 to side loader 16 before step 310 of mixing dry solid matter 30 and liquid matter 32 to form slurry 34. As suggested in FIG. 4, dry solid matter 30 and liquid matter 32 may be mixed near end 58. In some embodiments, side loader 16 includes a side feeder. In some embodiments, side loader 216 includes a side stuffer.

Method 300 may further include adding slurry 34 to compounding section 14 after mixing dry solid matter 30 and liquid matter 32 together to form slurry 34 and before mixing slurry 34 and initial material 28 in compounding section 14. Method 300 may further include adding dry solid matter 30 to compounding section 14, 214 at a first axial location and a first circumferential location and adding liquid matter 32 to compounding section 14, 214 at the first axial location and a second circumferential location. The second circumferential location is circumferentially spaced apart from the first circumferential location in some embodiments.

Method 400 includes a number of steps as shown in FIG. 9. In a step 402, continuous compounding system 10 is provided. Continuous compounding system 10 includes feeding section 12, roller cylinder 14 located downstream of feeding section 12, and side feeder 16 coupled to roller cylinder 14. In a step 404, initial formulation 26 is added to feeding section 12. In a step 406, initial formulation 26 is conveyed from feeding section 12 to roller cylinder 14. In a step 408, pressure is applied to initial formulation 26 with roller cylinder 14 to form initial material 28 such as molten resin 28 or viscous mass 28.

In a step 410, first dry solid matter 30 and liquid matter 32 are added to side feeder 16 to form a slurry 34 in side feeder 16. Slurry 34 includes first dry solid matter 30 and liquid matter 32. In a step 412, slurry 34 is added to roller cylinder 14. In a step 414, slurry 34 and initial molten resin 28 is mixed in roller cylinder 14.

In some embodiments, roller cylinder 14 includes cylinder 42 and cylinder 44 located downstream of cylinder 42. Method 400 may further include providing additional matter to cylinder 42. Step 412 of adding slurry 34 to roller cylinder 14 includes adding slurry 34 to cylinder 44.

The additional matter may include second dry solid matter. The first dry solid matter 30 and the second dry solid matter have the same formulation in some embodiments. The additional matter further includes a tackifying resin in some embodiments.

In one illustrative example, a continuous compounding machine is a planetary extruder. Prior to injecting liquid(s) into the planetary extruder via a side feeder, planetary gears in the planetary extruder were rotated to even out the wear pattern that result from injecting dry solid materials only into the planetary extruder. After liquid(s) were included, it was found that wear was minimized to the point that rotation of planetary gears was not needed.

The invention claimed is:

1. A method of providing a mixture, the method comprising
    providing a continuous compounding system that includes a feeding section, a roller cylinder located downstream of the feeding section, and a side feeder coupled to the roller cylinder,
    adding initial formulation to the feeding section and upstream of the side feeder,
    conveying the initial formulation from the feeding section to the roller cylinder after adding the initial formulation to the feeding section,
    applying pressure to the initial formulation with the roller cylinder to form an initial material,
    adding first dry solid matter and liquid matter to the side feeder to form a slurry in the side feeder, the slurry including the first dry solid matter and the liquid matter,
    adding the slurry to the roller cylinder to combine with the initial material after applying pressure to the initial formulation to form the initial material, and
    mixing the slurry and the initial material in the roller cylinder to provide the mixture.

2. The method of claim 1, wherein the roller cylinder includes a first cylinder and a second cylinder located downstream of the first cylinder, the method further includes providing additional matter to the first cylinder, and the step of adding the slurry to the roller cylinder includes adding the slurry to the second roller cylinder.

3. The method of claim 2, wherein the additional matter includes second dry solid matter.

4. The method of claim 3, wherein the first dry solid matter and the second dry solid matter have the same formulation.

5. The method of claim 2, wherein the additional matter further includes a tackifying resin.

6. The method of claim 1, wherein the first dry solid matter includes calcium carbonate.

7. The method of claim 1, wherein the liquid matter includes polyisobutylene.

8. The method of claim 1, wherein the initial material is a molten resin.

9. A method comprising
    providing a continuous compounding system that includes a feeding section and a compounding section located downstream of the feeding section,
    adding initial formulation to the feeding section upstream of the compounding section,
    conveying the initial formulation downstream from the feeding section to the compounding section,
    applying pressure to the initial formulation with the compounding section to form an initial material,
    mixing dry solid matter and liquid matter to form a slurry separate from the initial formulation,
    adding the slurry to the initial material through a port in the compounding section that is downstream of the feeding section; and
    mixing the slurry and the initial material in the compounding section,
    wherein applying pressure to the initial formulation in the compounding section occurs upstream of the port.

10. The method of claim 9, further comprising adding the dry solid matter and the liquid matter to a side loader before mixing the dry solid matter and the liquid matter to form the slurry.

11. The method of claim 9, further comprising adding the slurry to the compounding section after mixing the dry solid matter and the liquid matter to form the slurry and before mixing the slurry and the initial material in the compounding section.

12. The method of claim 9, further comprising adding the dry solid matter to the compounding section at a first axial location and a first circumferential location and adding the liquid matter to the compounding section at the first axial location and a second circumferential location.

13. The method of claim 12, wherein the second circumferential location is circumferentially spaced apart from the first circumferential location.

14. A continuous compounding system comprising
    a feeding section configured to receive initial formulation,
    a compounding section configured to receive the initial formulation from the feeding section and to apply pressure to the initial formulation to form an initial material, and,
    a side loader coupled to the compounding section and a liquid injector, the side loader is configured to convey solid dry matter into an open port formed in the compounding section at a location downstream of the feeding section, the liquid injector is configured to add liquid matter to at least one of the compounding section and the side loader at the location downstream of the feeding section.

15. The continuous compounding system of claim 14, wherein the liquid injector is coupled fluidly to the side loader.

16. The continuous compounding system of claim 15, wherein the side loader includes a side feeder configured to supply the dry solid matter to the compounding section.

17. The continuous compounding system of claim 16, wherein the side feeder further includes a spindle and a housing arranged around the spindle to define a side-loader passageway and the liquid injector is in fluid communication with the side-loader passageway.

18. The continuous compounding system of claim 17, wherein the spindle has a first end and a second end spaced apart from the first end, the second end of the spindle is located toward the compounding section, and the liquid injector is configured to inject fluid toward the second end of the spindle.

19. The continuous compounding system of claim 14, wherein the initial material is a molten resin.

20. The continuous compounding system of claim 14, wherein the compounding section includes a cylinder coupled to a downstream end of the feeding section and the open port and side feeder are spaced apart from the downstream end of the feeding section.

* * * * *